(12) United States Patent
Jing et al.

(10) Patent No.: US 7,725,451 B2
(45) Date of Patent: May 25, 2010

(54) GENERATING CLUSTERS OF IMAGES FOR SEARCH RESULTS

(75) Inventors: Feng Jing, Beijing (CN); Lei Zhang, Beijing (CN); Mingjing Li, Beijing (CN); Wei-Ying Ma, Beijing (CN); Chang-Hu Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 120 days.

(21) Appl. No.: 11/337,825

(22) Filed: Jan. 23, 2006

(65) Prior Publication Data

US 2007/0174269 A1   Jul. 26, 2007

(51) Int. Cl.
G06F 7/00 (2006.01)
G06F 17/30 (2006.01)

(52) U.S. Cl. ........................................ 707/707; 707/722
(58) Field of Classification Search ........................ None
See application file for complete search history.

(56) References Cited

U.S. PATENT DOCUMENTS

| | | | | |
|---|---|---|---|---|
| 6,119,124 A * | 9/2000 | Broder et al. | ........... | 707/103 R |
| 6,349,296 B1 * | 2/2002 | Broder et al. | .................. | 707/3 |
| 6,643,641 B1 * | 11/2003 | Snyder | ........................... | 707/4 |
| 6,728,752 B1 * | 4/2004 | Chen et al. | .................. | 709/203 |
| 6,823,335 B2 * | 11/2004 | Ikeda | ............................ | 707/6 |
| 6,944,612 B2 * | 9/2005 | Roustant et al. | ................ | 707/3 |
| 7,010,751 B2 * | 3/2006 | Shneiderman | .............. | 715/232 |
| 7,051,019 B1 * | 5/2006 | Land et al. | ...................... | 707/4 |
| 7,065,520 B2 * | 6/2006 | Langford | ........................ | 707/3 |
| 7,099,860 B1 * | 8/2006 | Liu et al. | ....................... | 707/3 |
| 7,644,373 B2 | 1/2010 | Jing et al. | | |
| 2004/0249774 A1 * | 12/2004 | Caid et al. | ..................... | 706/14 |
| 2006/0026152 A1 | 2/2006 | Zeng et al. | | |
| 2006/0242178 A1 * | 10/2006 | Butterfield et al. | .......... | 707/100 |
| 2007/0174865 A1 | 7/2007 | Jing et al. | | |
| 2007/0174872 A1 | 7/2007 | Vinberg et al. | | |
| 2007/0209025 A1 | 9/2007 | Jing et al. | | |
| 2008/0086468 A1 | 4/2008 | Jing et al. | | |
| 2008/0086686 A1 | 4/2008 | Jing et al. | | |

OTHER PUBLICATIONS http://www.flickr.com, Archived on http://www.archive.org on Feb. 18, 2005, pp. 1-5, available on http://web.archive.org/web/20050218030404/http://flickr.com/.*

(Continued)

*Primary Examiner*—Tim T. Vo
*Assistant Examiner*—Jeremy D Engelskirchen
(74) *Attorney, Agent, or Firm*—Perkins Coie LLP

(57) ABSTRACT

A method and system for generating clusters of images for a search result of an image query is provided. When an original image query is received, the search system identifies text associated with the original image query by submitting the original image query to a search engine. The search system identifies phrases from the text of the web page containing the search result. The search system uses each of the identified phrases as an image query and submits the image queries to an image search engine. The search system considers the image search result for each image query to represent a cluster of related images. The search system then presents the clusters of images as the images of the image search result of the original image query.

13 Claims, 4 Drawing Sheets

OTHER PUBLICATIONS

Ferragina et al., "The Anatomy of a Clustering Engine for Web-page Snippets", Jan. 29, 2004, University of Pisa, Tech. Report: TR-04-05.*
Kherfi et al., Image Retrieval from the World Wide Web: Issues, Techniques, and Systems, Mar. 2004, ACM Computing Surveys, vol. 36, No. 1, pp. 35-67.*
Mysore et al., DIOGENES: A Distributed Search Agent, May 2003, Technical Reports CSE-2003-24.*
U.S. Appl. No. 11/337,945, filed Jan. 23, 2006, Jing et al.
Brin, Sergey and Lawrence Page, "The anatomy of a large-scale hypertextual (Web) search engine," In the 7th International World Wide Web Conference, 1998.
Broder, Andrei, "A taxonomy of web search," SIGIR Forum 36(2), 2002, 8 pages.
Cai, Deng et al., "Hierarchical Clustering of WWW Image Search Results Using Visual, Textual and Link Analysis," MM'04, Oct. 10-16, 2004 New York, New,York, © 2004 ACM.
Chang, Shi Kuo and Arding Hsu, "Image Information Systems: Where do we go from here?," IEEE Transactions on Knowledge and Data Engineering, vol. 4, No. 5, Oct. 1992, pp. 431-442.
Chen, Hao and Susan Dumais, "Bringing Order to the Web: Automatically Categorizing Search Results," Proceedings of CHI'00, Human Factors in Computing Systems, pp. 145-152.
Dumais, Susan, Edward Cutrell and Hao Chen, "Optimizing Search by Showing Results in Context," SIGCHI'01, Mar. 31-Apr. 4, 2001, Seattle, Washington, © 2001 ACM.
Frankel, Charles, Michael J. Swain and Vassilis Athitsos, "WebSeer: An Image Search Engine for the World Wide Web," Aug. 1, 1996, Technical Report 96-14, Computer Science Department, The University of Chicago.
Glance, Natalie S., "Community Search Assistant," IUI'01, Jan. 14-17, 2001, Santa Fe, New Mexico, © 2001 ACM, pp. 91-96.
Google image search, http://images.google.com, [last accessed Jun. 7, 2007].
Google web search, http://www.google.com, [last accessed Jun. 7, 2007].
Hearst, Marti A. and Jan O. Pedersen, "Reexamining the Cluster Hypothesis: Scatter/Gather on Retrieval Results," In the Proceedings of ACM SIGIR, Aug. 1996, Zurich.
Huang, Jing et al., "Image Indexing using color correlograms," In Proc. IEEE Comp. Soc. Conf. Comp. Vis. and Patt. Rec., 1997, pp. 762-768.
Jansen, Major Bernard J. et al., "Real life information retrieval: a study of user queries on the Web," ACM SIGIR Forum 1998, vol. 32, No. 1, pp. 5-17.
Lempel, Ronny and Aya Soffer, "PicASHOW: Pictorial Authority Search by Hyperlinks on the Web," Proceedings of the 10th International WWW Conference, Hong Kong, China, 2001, ACM, pp. 438-448.
Liu, Hao et al., "Effective Browsing of Web Image Search Results," MIR'04, Oct. 15-16, 2004, New York, New York, © 2004 ACM.
Luo, Bo, Xiaogang Wang and Xiaoou Tang, "A World Wide Web Based Image Search Engine Using Text and Image Content Features," Internet Imaging IV, Proceedings of SPIE-IS&T, Electronic Imaging, SPIE, vol. 5018, 2003, © 2003 SPIE-IS&T, pp. 123-130.
MSRA clustering search, http://rwsm.directtaps.net/, [last accessed Jun. 7, 2007].
Photosig, http://www.photosig.com, [last accessed Aug. 17, 2006].
Picsearch image search, http://www.picsearch.com, [last accessed Jan. 5, 2006].
Rui, Yong and Thomas S. Huang, "Image Retrieval: Current Techniques, Promising Directions and Open Issues", Journal of Visual Communication and Image Representation, vol. 10, 39-62, Mar. 1999, © 1999 by Academic Press.
Sclaroff, Stan, Leonid Taycher and Marco Lacascia, "ImageRover: A Content-Based Image Browser for the World Wide Web," In IEEE Workshop on Content-based Access of Image and Video Libraries, San Juan, Puerto Rico, Jun. 1997, pp. 2-9.
Shen, Heng Tao et al., "Giving Meanings to WWW Images," Proceedings of ACM Multimedia 2000, Los Angeles, CA, pp. 39-47, © ACM 2000.
Smeulders, Arnold W.M. et al., "Content-Based Image Retrieval at the End of the Early Years," IEEE Transactions on Pattern Analysis and Machine Intelligence, vol. 22, No. 12, Dec. 2000, pp. 1349-1380, © 2000 IEEE.
Smith, John R. and Shih-Fu Chang, "Visually Searching the Web for Content," IEEE Multimedia, 1997, pp. 12-20, © 1997 IEEE.
Teevan, Jaime et al., "The Perfect Search Engine Is Not Enough: A Study of Orienteering Behavior in Directed Search," CHI 2004, Apr. 24-29, Vienna, Austria, , pp. 415-422.
Vivisimo clustering search, http://vivisimo.com, [last accessed Jun. 7, 2007].
Wang, Xin-Jing et al., "Grouping Web Image Search Result," MM'04, Oct. 10-16, 2004, New York, New York, pp. 436-439, © 2004 ACM.
White, David A. and Ramesh Jain, "Similarity Indexing: Algorithms and Performance," 2 / SPIE, Feb. 1-2, 1996, San Jose, California, vol. 2670, pp. 63-73, © 1996 The Society of Photo-Optical Instrumentation Engineers.
Woodruff, Allison et al., "Using Thumbnails to Search the Web," Proceedings of SIGCHI, Mar. 31-Apr. 4, 2001, Seattle, Washington, pp. 198-205, © 2001 ACM.
Yahoo Homepage search, http://www.yahoo.com/, [last accessed Jun. 7, 2007].
Yahoo image search, http://images.search.yahoo.com/, [last accessed Jun. 7, 2007].
Zamir, Oren and Oren Etzioni, "Web Document Clustering: A Feasibility Demonstration," In Proceedings of SIGIR'98, Melbourne, Australia, pp. 46-54, © 1998 ACM.
Zeng, H.J. et al, "Learning to Cluster Web Search Results," SIGIR'04, Jul. 25-29, 2004, Sheffield, South Yorkshire, UK, © 2004 ACM.
Zhang, L. et al., "Enjoy High Quality Photos in Vertical Image Search Engine," Submitted to the SIGCHI 2006 Conference on Human Factors in Computing Systems.

* cited by examiner

GENERATING CLUSTERS OF IMAGES FOR SEARCH RESULTS

BACKGROUND

Many search engine services, such as Google and Overture, provide for searching for information that is accessible via the Internet. These search engine services allow users to search for display pages, such as web pages, that may be of interest to users. After a user submits a search request (also referred to as a "query") that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of base web pages to identify all web pages that are accessible through those base web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how related the information of the web page may be to the search request. The search engine service then displays to the user links to those web pages in an order that is based on their relevance.

Several search engine services also provide for searching for images that are available on the Internet. These image search engines typically generate a mapping of keywords to images by crawling the web in much the same way as described above for mapping keywords to web pages. An image search engine service can identify keywords based on text of the web pages that contain the images. An image search engine may also gather keywords from metadata associated with images of web-based image forums, which are an increasingly popular mechanism for people to publish their photographs and other images. An image forum allows users to upload their photographs and requires the users to provide associated metadata such as title, camera setting, category, and description. The image forums typically allow reviewers to rate each of the uploaded images and thus have ratings on the quality of the images. Regardless of how the mappings are generated, an image search engine service inputs an image query and uses the mapping to find images that are related to the image query. An image search engine service may identify thousands of images that are related to an image query and presents thumbnails of the related images. To help a user view the images, an image search engine service may order the thumbnails based on relevance of the images to the image query. An image search engine service may also limit the number of images that are provided to a few hundred of the most relevant images so as not to overwhelm the viewer.

Unfortunately, the relevance determination may not be particularly accurate because image queries may be ambiguous (e.g., "tiger" may represent the animal or the golfer), the keywords derived from web pages may not be very related to an image of the web page (e.g., a web page can contain many unrelated images), and so on. To help a user view the thousands of images, an image search engine service could cluster a search result based on the content of the images and present the clusters, rather than individual images, to the user. Such clustering techniques include content-based techniques and link-based techniques. The content-based techniques use low-level visual information to identify related images. There are, however, disadvantages to content-based clustering. Content-based clustering is computationally expensive and cannot be practically performed in real time when an image search result contains thousands of images. Moreover, if the clustering is limited to a few hundred of what are thought to be the most relevant images, some very relevant images may be missed because of the difficulties in assessing relevance. The link-based search techniques typically assume that images on the same web page are likely to be related and that images on web pages that are each linked to by the same web page are related. Since this assumption is, however, often not true, unrelated images are often clustered together. It is also difficult for either cluster technique to automatically identify meaningful names for a cluster of images. As a result, a user may not be able to effectively identify relevant clusters.

SUMMARY

A method and system for generating clusters of images for a search result of an image query is provided. An image search system receives an original image query, identifies phrases related to the original image query, submits to an image search engine each of the identified phrases as an image query, and provides the images of each image search result as a cluster of images for the image search result of the original image query. When an original image query is received, the search system identifies text associated with the original image query by submitting the original image query to a search engine. The search system identifies phrases from the text of the web page containing the search result. The search system uses each of the identified phrases as an image query and submits the image queries to an image search engine. The search system considers the image search result for each image query to represent a cluster of related images. The search system then presents the clusters of images as the images of the image search result of the original image query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
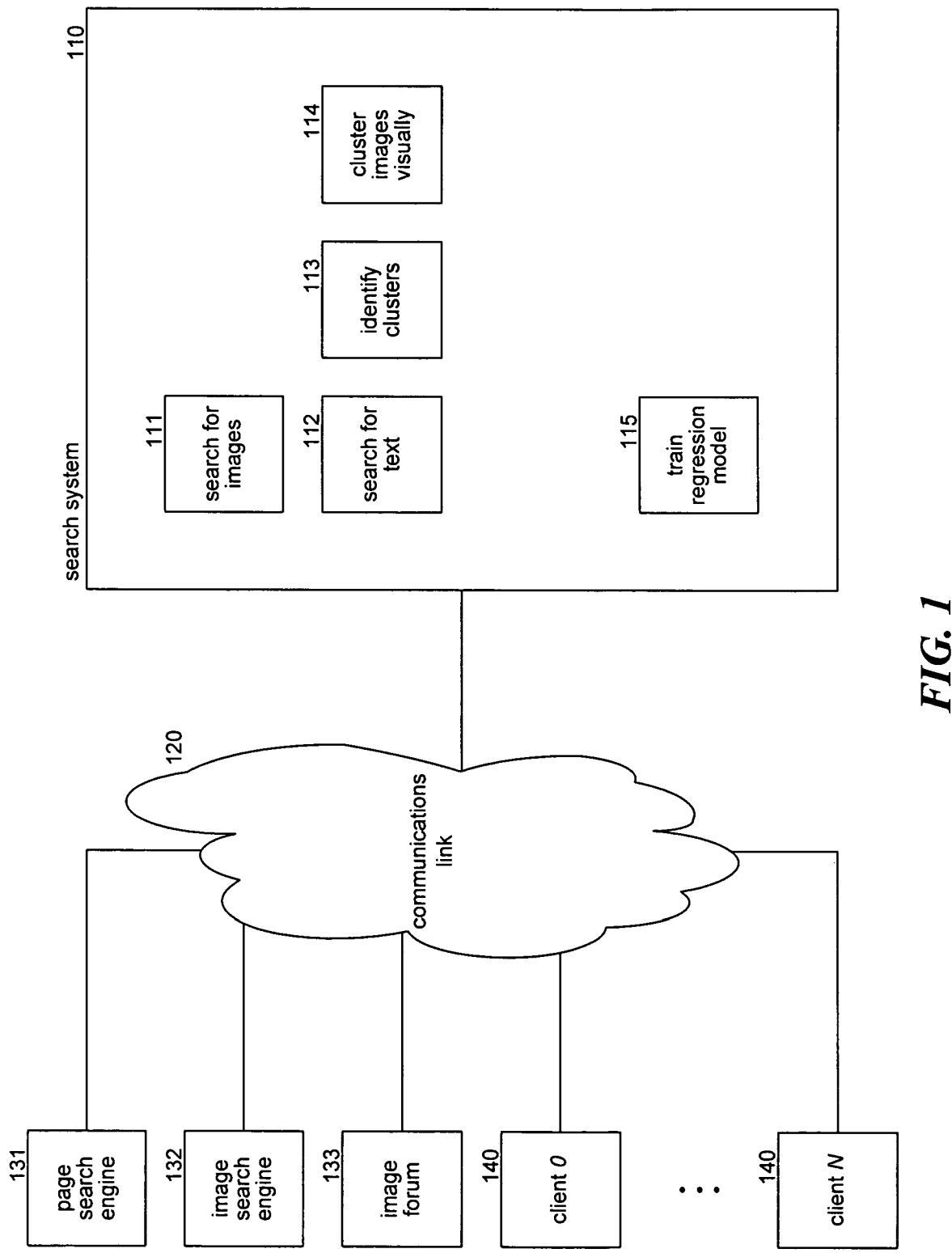
FIG. 1 is a block diagram that illustrates components of the search system in one embodiment.

A method and system for generating clusters of images for a search result of an image query is provided. In one embodiment, an image search system receives an original image query, identifies phrases related to the original image query, submits to an image search engine each of the identified phrases as an image query, and provides the images of each image search result as a cluster of images for the image search result of the original image query. When an image query is received, the search system identifies text associated with the image query. The search system may identify the text by submitting the original image query to a conventional web page search engine. The conventional search engine searches for web pages that are related to the original image query and returns a web page that contains links to the related web pages possibly along with a snippet of text from those web pages. Upon receiving the web page containing the search result, the search system identifies phrases from the text of the web page containing the search result. For example, if the original image query is "tiger," then the search result web page (as part of the links or in the snippets) may contain the phrases "white tiger," "Tiger Woods," "crouching tiger," and so on. The search system uses each of the identified phrases as an image query and submits the image queries to an image search engine. The search system considers the image search result for each image query to represent a cluster of related images. For example, the search system submits to an image search engine the phrase "white tiger" as an image query and receives the image search result. The search system considers images of the image search result to be a cluster of images relating to "white tiger." The search system also submits to an image search engine the phrase "Tiger Woods" as an image query and receives the image search result. The search system considers the images of the image search result to be a cluster of images related to "Tiger Woods." The search system may also submit the original image query to the image search engine to generate an "others" cluster. The search system may remove from the "others" cluster those images that are already in another cluster. For example, the search system submits "tiger" to the image search engine, removes from the image search result the images that are also in the "white tiger," "Tiger Woods," and "crouching tiger" image search results and forms an "others" cluster of the remaining images. The search system then presents to a user the clusters of images as the images of the image search result of the original image query, such as "tiger." In addition, the search system may use the phrase of the image query as the name of the cluster. For example, one cluster may be named "white tiger," and another cluster may be named "Tiger Woods." In this way, the search system can generate an image search result that has clusters of images without the computational expense of identifying clusters from a set of images and can provide meaningful names to the clusters.

In one embodiment, the search system may identify phrases from query logs. A query log contains the queries that have been submitted to a search engine. The search system may identify the most popular queries that contain the original image query and use those as phrases. For example, the most popular queries that contain "tiger" may be "Tiger Woods" and "Detroit Tigers." The search system then submits each query to an image search engine and names the cluster of image search result with the text of the query.

In one embodiment, the search system may present the images within each cluster in an order based on relevance as determined by the image search engine service to which the identified phrase was submitted. The search system may also generate sub-clusters of images within each cluster. The search system may identify sub-clusters based on the visual similarities between the images of a cluster. Because of the computational expense of identifying visually similar images, the search system may maintain a mapping of images (e.g., identified by URL) to a feature set of visual features. The search system can then generate the sub-clusters based on the feature sets of the images without having to generate the feature sets at the time of the query. The search system may use various well-known clustering techniques to identify clusters of visually similar images from the feature sets.

In one embodiment, the search system may identify phrases from the text identified from an image search result provided by an image search engine, such as one adapted to search image forums. As described above, an image forum may contain metadata associated with the images that have been uploaded by users of the forum. The search system may submit the original image query to the image search engine for an image forum. The search result may contain the thumbnails of images along with metadata. The search system identifies the text of the metadata for use in identifying phrases for use in generating clusters of images for the image search result. The search system may identify text from search results provided by various web page-based search engines and image search engines.

The search system may identify phrases using various techniques for identifying key phrases. For example, the search system may extract all phrases of certain lengths (e.g., n-grams) from the text of the search result and identify the various properties of the phrases such as phrase frequency, the document frequency, phrase length, and so on. The search system may identify the key phrases based on the properties of the phrases. The search system may also filter the key phrases based on those that are unlikely to generate meaningful results (e.g., too many noise words), likely to generate redundant results (e.g., "tiger photo" and "tiger photograph"), and so on. After the search system submits a key phrase and receives the image search result for the cluster associated with that key phrase, the search system may merge, discard, or otherwise modify the clusters. For example, the search system may discard clusters that have too many or too few images or that have too many images in common with other clusters. The search system may also merge clusters with too few images that appear to have many images in common. Techniques for identifying phrases from a search result that can be used for clustering the search results are described in Zeng, H., He, Q., Chen, Z., Ma, W., and Ma, J., "Learning to Cluster Web Search Results," SIGIR 2004, July 25-29, Sheffield, South Yorkshire, U.K., and U.S. patent application Ser. No. 10/889,841, entitled "Query-Based Snippet Clustering for Search Result Grouping" and filed on Jul. 13, 2004, which are hereby both incorporated by reference. One technique described in these references trains a linear regression model to learn the scores of phrases from a feature set of the phrases.

FIG. 1 is a block diagram that illustrates components of the search system in one embodiment. The search system 110 is connected via communications link 120 to web page search engines 131, image search engines 132, image forums 133, and client computing devices 140. The search system includes a search for images component 111, a search for text component 112, an identify clusters component 113, and a cluster images visually component 114. The search for images component receives an original image query from a client computing device and invokes the search for text component to identify text from which to extract the phrases The search for text component may submit the original image query to one or more page search engines and image search engines The search for text component then extracts the text along with properties (e.g., font) from the page search results and image search results. The search for images component invokes the identify clusters component to identify phrases from the extracted text. The identify clusters component identifies key phrases from the extracted text that are to be used to generate the clusters of the image search result. The search for images component then submits each key phrase to an image search engine to identify the images for the cluster represented by that key phrase. The search for images component may optionally invoke the cluster images visually component to generate sub-clusters within a cluster of images. The search system may then present the clusters of images as the image search result to a user who submitted the original image query using the user interface described in U.S. patent application Ser. No. 11/337,945, entitled "User Interface for Viewing Clusters of Images" and filed concurrently, which is hereby incorporated by reference. The search system may also include a train regression model component 115 to train a regression model for identifying key phrases as described in U.S. patent application Ser. No. 10/889,841, entitled "Query-Based Snippet Clustering for Search Result Grouping" and filed on Jul. 13, 2004, which is hereby incorporated by reference.

The computing devices on which the search system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the search system. In addition, the data structures and message structures may be stored or transmitted via a data transmission medium, such as a signal on a communications link. Various communications links may be used, such as the Internet, a local area network, a wide area network, or a point-to-point dial-up connection.

The search system may receive original image queries from various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The search system may also provide its services to various computing systems such as personal computers, cell phones, personal digital assistants, consumer electronics, home automation devices, and so on.

The search system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the search system may include a page search engine and/or an image search engine and may not use the services of an external search engine.

Figure 2:
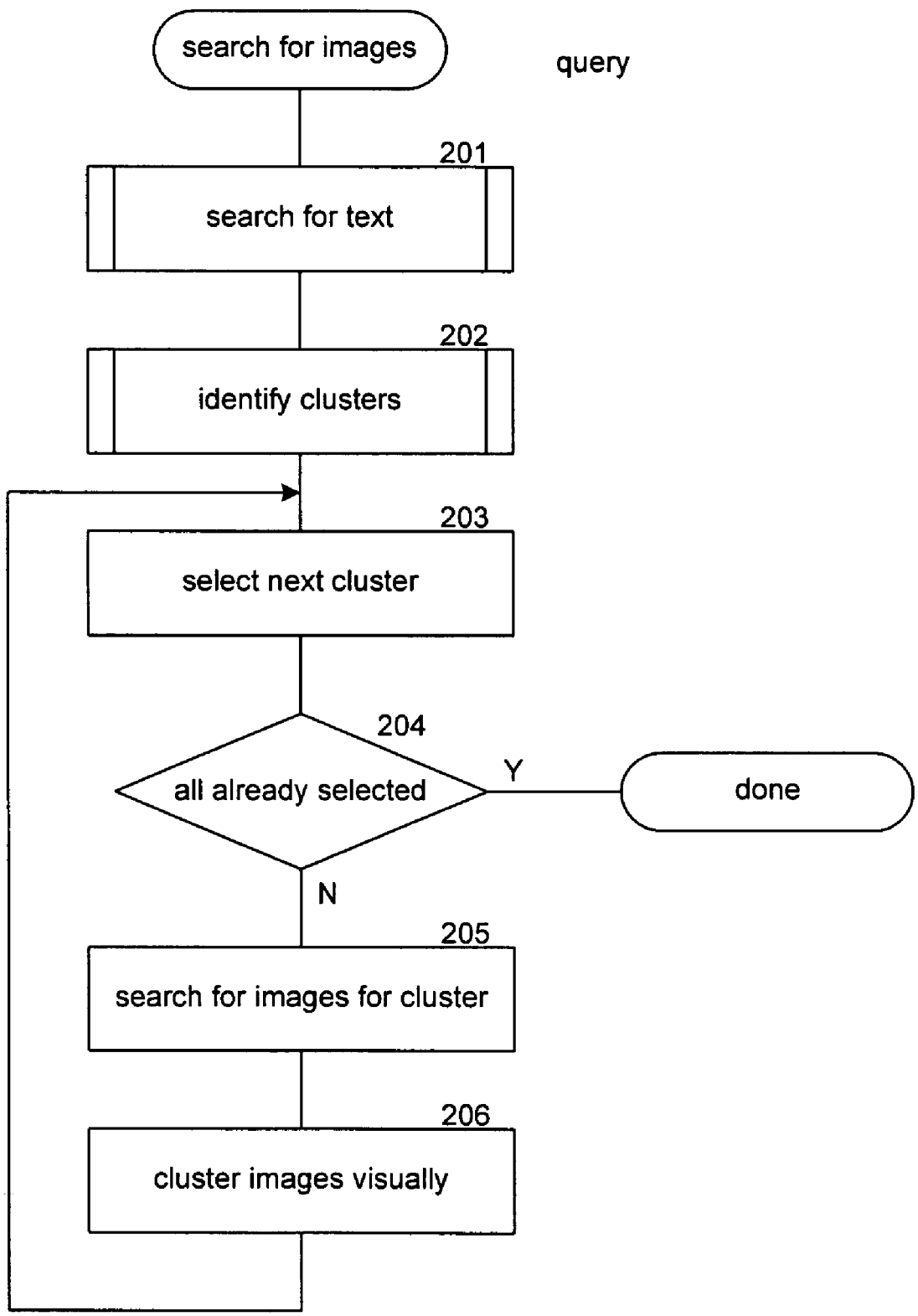
FIG. 2 is a flow diagram that illustrates the processing of the search for images component of the search system in one embodiment.

FIG. 2 is a flow diagram that illustrates the processing of the search for images component of the search system in one embodiment. The component is passed an original image query and returns clusters of images as the image search result. In block 201, the component invokes the search for text component to identify text associated with the original image query. In block 202, the component invokes the identify clusters component to identify key phrases from the identified text that are used to identify images of a cluster associated with each key phrase. In blocks 203-206, the component loops submitting each key phrase of a cluster to an image search engine. In block 203, the component selects the next cluster. In decision block 204, if all the clusters have already been selected, then the component completes, else the component continues at block 205. In block 205, the component submits the key phrase of the selected cluster to an image search engine to identify images for the selected cluster. In block 206, the component may optionally generate sub-clusters of the image search result based on visual similarity of the images. The generating of sub-clusters results in a hierarchy of clusters. The component then loops to block 203 to select the next cluster.

Figure 3:
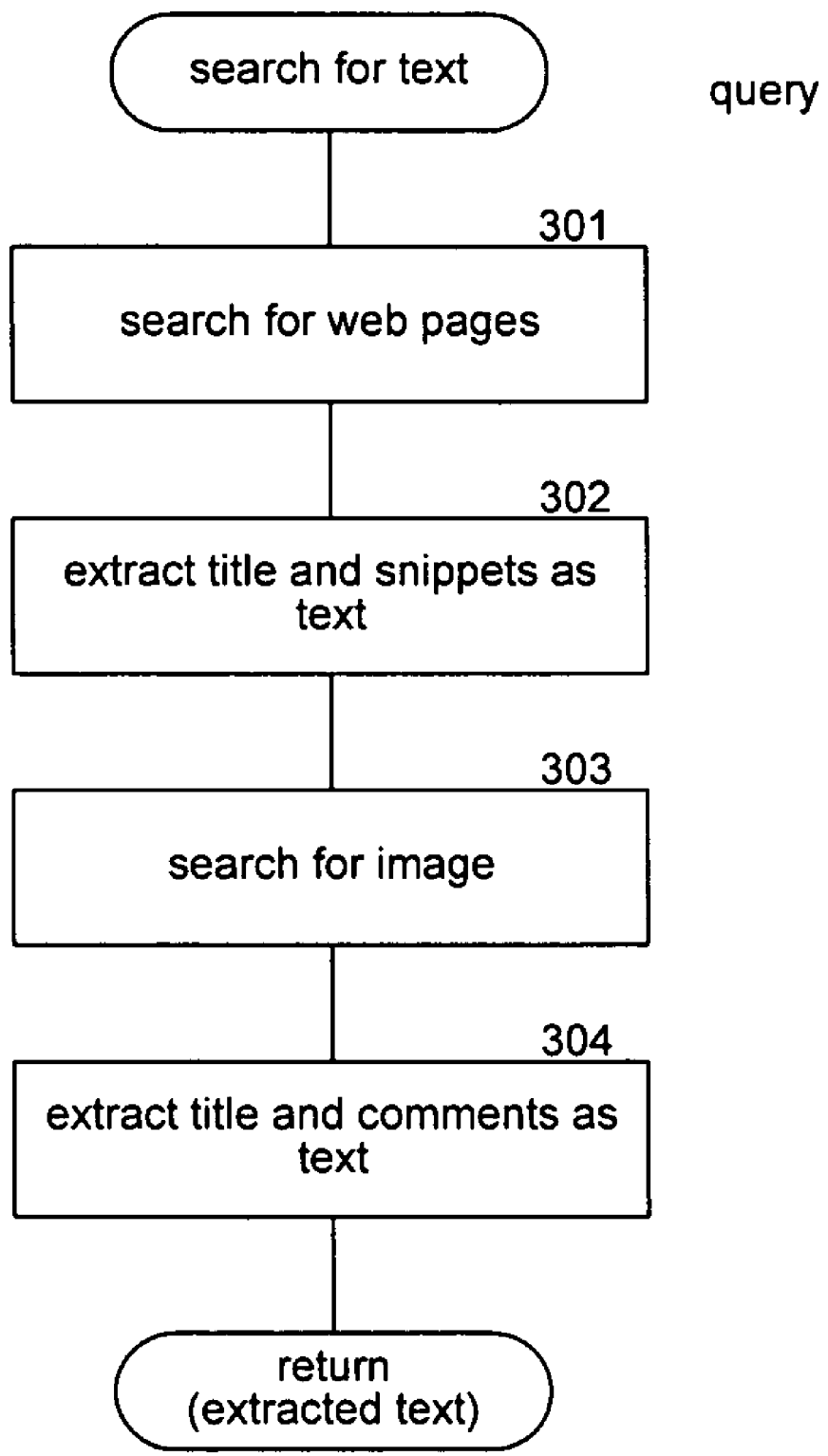
FIG. 3 is a flow diagram that illustrates the processing of the search for text component of the search system in one embodiment.

FIG. 3 is a flow diagram that illustrates the processing of the search for text component of the search system in one embodiment. The component is passed an original image query and returns text associated with the original image query. In block 301, the component submits the original image query to a page search engine. In block 302, the component extracts, from the web page containing the search result, titles and snippets as text. In block 303, the component submits the original image query to an image search engine. In block 304, the component extracts, from the web pages containing the image search result, titles, snippets, and other metadata as text and then returns the text. The component may submit the original image query to various page search engines and image search engines in parallel and process each search result as it is received.

Figure 4:
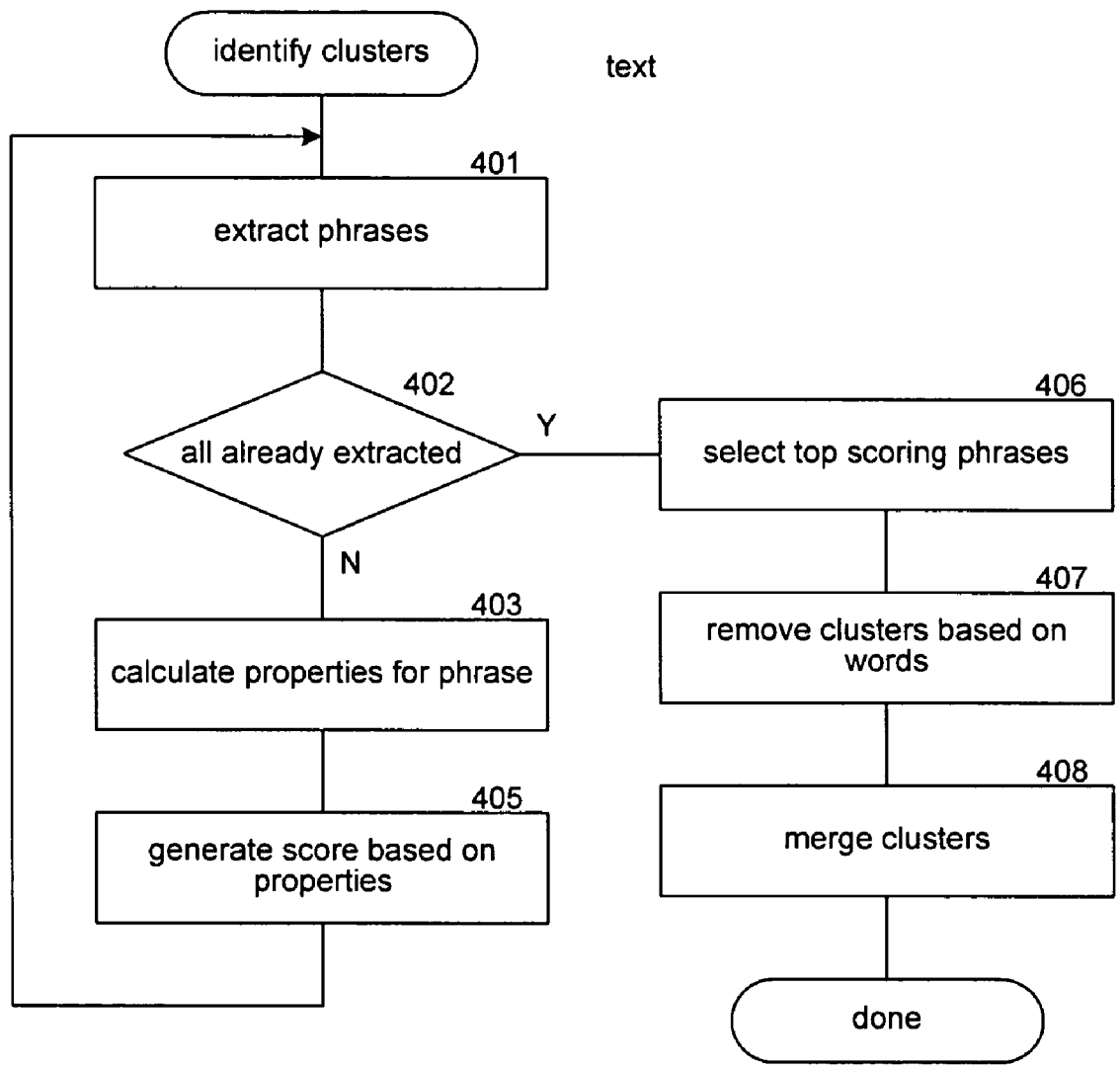
FIG. 4 is a flow diagram that illustrates the processing of the identify clusters component of the search system in one embodiment.

FIG. 4 is a flow diagram that illustrates the processing of the identify clusters component of the search system in one embodiment. The component is passed text and identifies key phrases of the text for use in generating clusters of images. In blocks 401-405, the component loops extracting and scoring the phrases. In block 401, the component extracts the next phrase from the text. In decision block 402, if all the phrases have already been extracted, then the component continues at block 406, else the component continues at block 403. In block 403, the component calculates the properties (e.g., frequency) for the extracted phrase. In block 405, the component generates a score for the extracted phrase based on the generated properties using, for example, a linear regression model. The component then loops to block 401 to extract the next phrase. In block 406, the component selects the top scoring phrases to be key phrases. For example, the component may select the top 30scoring phrases as key phrases. In block 407, the component may remove certain of the selected phrases, such as those phrases with too many noise words or that are duplicates. In block 408, the component may effectively merge clusters by combining phrases that are similar. The component then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The search system may be used to cluster content of various types, such as photographs, drawings, artwork, videos, music, and so on. The search system may also be used an alternate way to cluster web pages of a conventional web page search. The search system may identify phrases for clusters as described above from text derived from the search result by submitting the original page query to a web page search engine. The search can then submit each phrase to a web page search engine to identify the web pages for the cluster and return the clusters as the search result for the original page query. The search system may also submit variations of the original image query, rather than the original image query itself, to identify text. For example, if the original image query is long or does not produce enough results, the search system may divide the original image query into sub-queries and submit each sub-query to a search engine to identify text. Accordingly, the invention is not limited except as by the appended claims.

We claim:

1. A computing device for generating clusters of images, comprising:

a memory containing computer-executable instructions comprising:
  a component that receives an image query having search terms;
  a component that submits the image query to a web-based search engine and receives search results that include links to web pages and text associated with each link, the text being a snippet describing content of the linked-to web page, the web-based search engine being a search engine that maintains an index of keywords to web pages and when a query is submitted, the web-based search engine identifies web pages for search results using the index of keywords to identify web pages that match the submitted query and returns as search results links to the identified web pages and associated snippets;
  a component that identifies phrases associated with the image query by identifying phrases from the snippets of the search results;
  a component that identifies images associated with each identified phrase by submitting each identified phrase to an image search engine and receiving identifications of images as search results for each submitted phrase wherein the identified images associated with each submitted phrase represent a cluster of images related to that submitted phrase, the image search engine being a search engine that maintains an index of keywords to images and when a query is submitted, the image search engine identifies images for the search results using the index of keywords to identify images that match the submitted query and returns as search results links to the identified images, the image search engine being different from the web-based search engine; and
  a component that displays an indication of each cluster of images as search results for the received image query; and
a processor for executing the computer-executable instructions stored in the memory.

2. The computing device of claim 1 including a component that generates sub-clusters of the cluster of images.

3. The computing device of claim 1 wherein the component that identifies phrases scores phrases based on learned scores for attributes of the phrases.

4. A computer-readable medium storing computer-executable instructions for controlling a computing device to generate clusters of images, by a method comprising:
  receiving an image query having search terms;
  submitting the image query to a web-based search engine and receives search results that include links to web pages and text associated with each link, the text being a snippet describing content of the linked-to web page, the web-based search engine being a search engine that maintains an index of keywords to web pages and when a query is submitted, the web-based search engine identifies web pages for search results using the index of keywords to identify web pages that match the submitted query and returns as search results links to the identified web pages and associated snippets;
  identifying phrases associated with the image query by identifying phrases from the snippets of the search results;
  identifying images associated with each identified phrase by submitting each identified phrase to an image search engine and receiving identifications of images as search results for each submitted phrase wherein the identified images associated with each submitted phrase represent a cluster of images related to that submitted phrase, the image search engine being a search engine that maintains an index of keywords to images and when a query is submitted, the image search engine identifies images for the search results using the index of keywords to identify images that match the submitted query and returns as search results links to the identified images, the image search engine being different from the web-based search engine; and
  displaying an indication of each cluster of images as search results for the received image query.

5. The computer-readable medium of claim 4 including generating sub-clusters of the cluster of images.

6. The computer-readable medium of claim 4 wherein the identifying of phrases scores phrases based on learned scores for attributes of the phrases.

7. The computer-readable medium of claim 4 wherein a submitted phrase represents a name for the cluster.

8. The computer-readable medium of claim 4 including generating sub-clusters of the clusters of images based on visual similarity of images of a cluster.

9. A method performed by a computing device for generating clusters of images, by a method comprising:
  receiving an image query having search terms;
  submitting by the computing device the image query to a web-based search engine and receives search results that include links to web pages and text associated with each link, the text being a snippet describing content of the linked-to web page, the web-based search engine being a search engine that maintains an index of keywords to web pages and when a query is submitted, the web-based search engine identifies web pages for search results using the index of keywords to identify web pages that match the submitted query and returns as search results links to the identified web pages and associated snippets;
  identifying by the computing device phrases associated with the image query by identifying phrases from the snippets of the search results;
  identifying by the computing device images associated with each identified phrase by submitting each identified phrase to an image search engine and receiving identifications of images as search results for each submitted phrase wherein the identified images associated with each submitted phrase represent a cluster of images related to that submitted phrase, the image search engine being a search engine that maintains an index of keywords to images and when a query is submitted, the image search engine identifies images for the search results using the index of keywords to identify images that match the submitted query and returns as search results links to the identified images, the image search engine being different from the web-based search engine; and
  displaying an indication of each cluster of images as search results for the received image query.

10. The method of claim 9 including generating sub-clusters of the cluster of images.

11. The method of claim 9 wherein the identifying of phrases scores phrases based on learned scores for attributes of the phrases.

12. The method of claim 9 wherein a submitted phrase represents a name for the cluster.

13. The method of claim 9 including generating sub-clusters of the clusters of images based on visual similarity of images of a cluster.

* * * * *